United States Patent
Kawada et al.

(10) Patent No.: US 7,305,032 B2
(45) Date of Patent: Dec. 4, 2007

(54) IMAGE MATCHING DEVICE AND METHOD FOR MOTION PICTURES

(75) Inventors: Ryoichi Kawada, Saitama (JP); Osamu Sugimoto, Saitama (JP); Masahiro Wada, Saitama (JP); Atsushi Koike, Saitama (JP)

(73) Assignee: KDDI Corporation, Tokyo (JP)

(*) Notice: Subject to any disclaimer, the term of this patent is extended or adjusted under 35 U.S.C. 154(b) by 847 days.

(21) Appl. No.: 10/620,350

(22) Filed: Jul. 17, 2003

(65) Prior Publication Data

US 2004/0022320 A1    Feb. 5, 2004

(30) Foreign Application Priority Data

Aug. 2, 2002  (JP) .............................. 2002-226055
May 27, 2003 (JP) .............................. 2003-149572

(51) Int. Cl.
*H04B 1/66*    (2006.01)

(52) U.S. Cl. ................................. 375/240.16

(58) Field of Classification Search .......... 375/240.16, 375/240.15, 240.17; 382/236, 154; 348/42, 348/43; *H04B 1/66*
See application file for complete search history.

(56) References Cited

U.S. PATENT DOCUMENTS

| | | | |
|---|---|---|---|
| 5,767,898 A * | 6/1998 | Urano et al. | 348/43 |
| 5,838,828 A * | 11/1998 | Mizuki et al. | 382/236 |
| 6,430,224 B1 * | 8/2002 | Naito et al. | 375/240.16 |
| 7,054,479 B2 * | 5/2006 | Aucsmith et al. | 382/154 |

FOREIGN PATENT DOCUMENTS

| | | |
|---|---|---|
| JP | 7-336691 A | 12/1995 |
| JP | 8-018978 A | 1/1996 |
| JP | 2000-076449 A | 3/2000 |

OTHER PUBLICATIONS

Office Action dated Jan. 17, 2007 issued in corresponding Japanese Application No. 2002-226055.
R. Kawada et al., "Improvement in Motion-compensated TV Standards Conversion" The Journal of the Institute of Image Information and Television Engineers, vol. 51, No. 9 (1997), pp. 1577-1586 (English Abstract, see page 1 & 10 in the spec.).
"Image Processing Handbook" edited by Morio Onoe, Shokodo, pp. 392-397 (No English Translation, see p. 395 in the article and the p. 9 in the spec.), Feb. 24, 1988.

* cited by examiner

*Primary Examiner*—Tung Vo
(74) *Attorney, Agent, or Firm*—Westerman, Hattori, Daniels & Adrian, LLP.

(57) ABSTRACT

A matching section performs motion estimation upon a predetermined processing unit of input video (p) by, e.g., an iterative gradient method. A motion vector (v) obtained by the iterative gradient method is obtained by the expression $v = \alpha \cdot \Delta v + v_0$ (wherein $v_0$ indicates an initial displacement motion vector and $\Delta v$ indicates a differential vector). A characteristic amount extraction section extracts a characteristic amount from the distribution of motion vectors obtained by the motion estimation. A parameter determination section determines a conversion parameter $\alpha$ applied to the next processing unit by the characteristic amount. If the characteristic amount is equal to or larger than a predetermined threshold, the conversion parameter $\alpha$ is determined to be larger (e.g., $\alpha = 1$). If the characteristic amount is smaller than the threshold, the conversion parameter $\alpha$ is determined to be smaller (e.g., $\alpha = 0.1$).

5 Claims, 6 Drawing Sheets

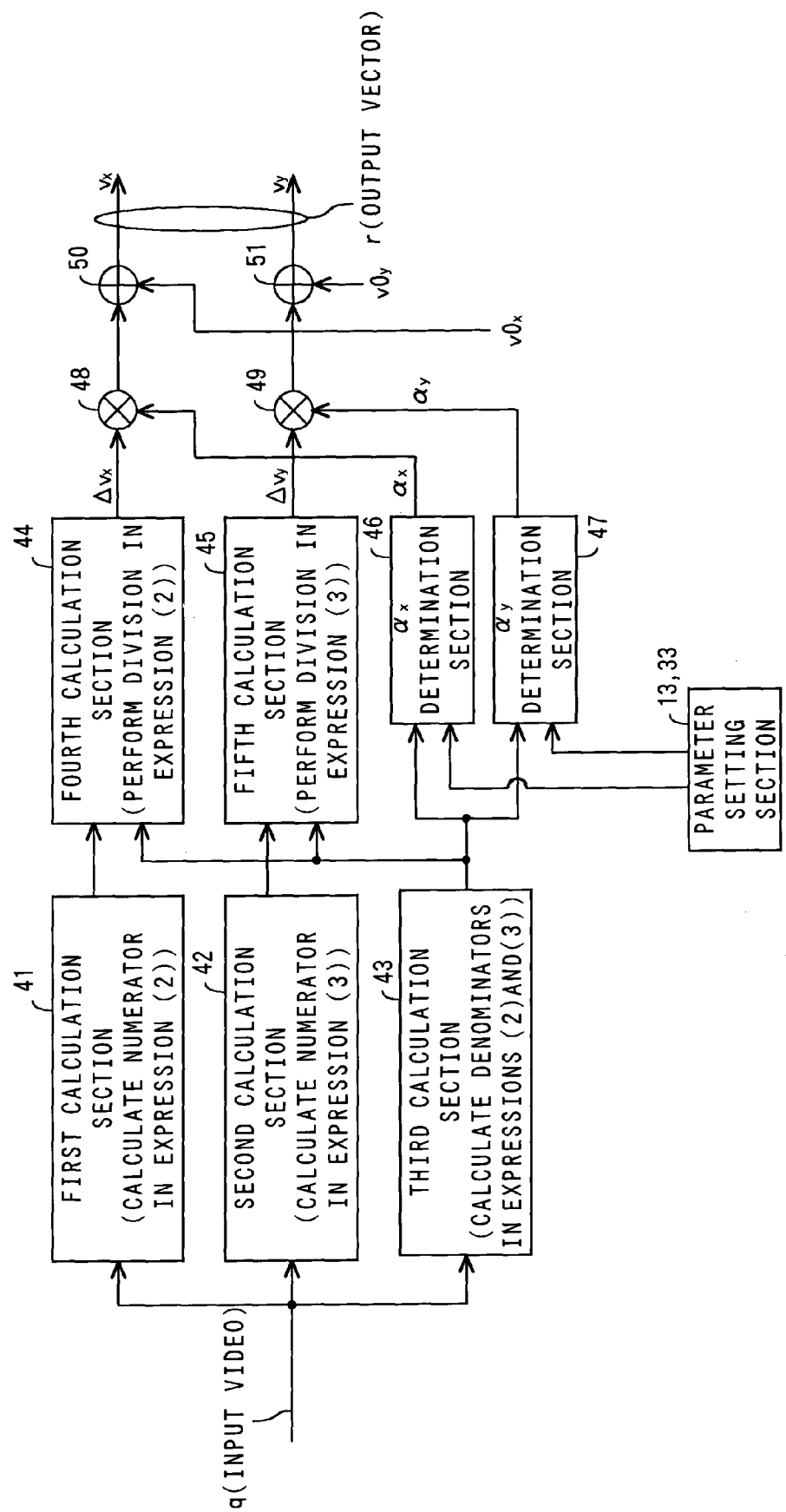

Fig. 5                                            PRIOR ART

| SCENE | Interview | Carousel | AVERAGE |
|---|---|---|---|
| CONVENTIONAL SYSTEM 1 (FIXED) | 34.4 | 32.0 | 33.2 |
| CONVENTIONAL SYSTEM 2 (FIXED) | 38.5 | 29.4 | 33.9 |
| SYSTEM OF PRESENT INVENTION (ADAPTIVE) | 38.5 | 31.2 | 34.8 |

IMAGE MATCHING DEVICE AND METHOD FOR MOTION PICTURES

BACKGROUND OF THE INVENTION

1. Field of the Invention

The present invention relates to an image matching device and method for motion pictures which are suitable for the case of performing a motion-compensated TV standards conversion, a video encoding or a depth extraction processing from stereo videos (a set of stationary images or videos formed of a left eye image and a right eye image) and which automatically estimate motion in an videos or automatically detect corresponding points between stereo videos formed of a left eye and right eye images.

2. Description of the Related Art

Conventional examples of systems usually used in an image matching processing for automatically estimating motion in videos or automatically detecting corresponding points between stereo videos formed of a left eye and right eye images as in a television broadcasting and a visual telephone include a block matching method and an iterative gradient method. As one of documents to explain such methods, there is "Improvement in motion-compensated TV standards conversion" (Kawada et. al, The journal of the institute of image information and television engineers, Vol. 51, No. 9 (1997), pp. 1577 to 1586).

In the case of the motion estimation, a video is basically divided into a large number of small blocks. Then, a current frame is compared to a previous frame for each of the blocks to calculate motion. In the case of the stereo matching, "the current frame" and "the previous frame" may be substituted with "a left eye image" and "a right eye image", respectively. Thus, the invention of the present application will mainly describe the case of the motion estimation and a detailed description of the case of the stereo matching will be omitted.

According to the aforementioned image matching processing, the case in which a correct matching can be performed and the case in which the correct matching cannot be performed occur depending on a pattern or design of an input video. In the case of the iterative gradient method, for example, the following description can be given.

A motion vector v (for each block within a video) which is calculated by the iterative gradient method can be calculated by the following expression (1) with an initial displacement motion vector being indicated by $v_0$ (see the aforementioned publication).

$$V = \Delta V + V_0 \quad (1)$$

wherein the horizontal and vertical components $\Delta v_x$ and $\Delta v_y$ of a differential vector $\Delta v$ can be expressed by the following expressions (2) and (3) by using horizontal and vertical gradients $\Delta x$, $\Delta y$ of a pixel value and a difference $\Delta t$ between motion-compensated fields (or frames) by the initial displacement motion vector $v_0$. The sum may be applied to all pixels within the corresponding block.

$$\Delta v_x = \frac{(\sum \Delta_x \Delta_y)(\sum \Delta_t \Delta_y) - (\sum \Delta_y^2)(\sum \Delta_t \Delta_x)}{\sum \Delta_x^2 \sum \Delta_y^2 - (\sum \Delta_x \Delta_y)^2} \quad (2)$$

$$\Delta v_y = \frac{(\sum \Delta_x \Delta_y)(\sum \Delta_t \Delta_x) - (\sum \Delta_x^2)(\sum \Delta_t \Delta_y)}{\sum \Delta_x^2 \sum \Delta_y^2 - (\sum \Delta_x \Delta_y)^2} \quad (3)$$

The initial displacement motion vector $v_0$ is determined by a matching with already calculated motion vectors of neighbor blocks being candidates (see the aforementioned publication).

In expressions (2) and (3), especially when denominators are small, calculations similar to a division by 0 are performed. Thus, large errors may be generated even by small disturbance factors such as noises.

Especially when a regularly repeated pattern exists in the pattern or design, problems may be presented. In such case, image matching can be found in a large number of motion vectors. Thus, motion vectors that are different from actual motions are calculated due to noises or the like, so that an interpolated video may be extremely degraded when performing the TV standards conversion.

On the other hand, in accordance with the iterative gradient method, motions are calculated iteratively by using gradients of image surfaces. Thus, if correlation between frames is small, motions are hardly calculated. From this point of view, scenes shot by a high speed shutter especially present problems. Because motion objects are set apart between videos which are adjacent with each other in view of time, motions tend to be hardly captured.

As described above, there exists a video which becomes problematic when $\Delta v$ becomes large and a video which becomes problematic when $\Delta v$ becomes small such as a video in which a regularly repeated pattern exists in a design and a video with small correlation between frames. Accordingly, there arises a problem in that if a matching processing for the former image is performed successfully, a matching processing for the latter image is not performed successfully, and vice versa.

In addition, according to a conventional block-based matching processing, when different motions exist within the corresponding block, for example, when the boundary between a motion image and a background image exists within a block, a correct motion vector cannot be calculated.

SUMMARY OF THE INVENTION

An object of the present invention is to provide an image matching device and method which perform an appropriate matching processing videos with different features such as a regularly repeated pattern, scenes shot by a high speed shutter, etc. Another object of the present invention is to provide a matching method which can obtain more correct motion vector even when different motions exist within a block.

In order to achieve the object, the invention is firstly characterized in that an image matching device for at least one of automatically estimating motion in a motion picture and automatically detecting a corresponding point between stereo videos formed of a left eye and right eye images comprises matching means for performing a matching processing upon a video, characteristic amount extraction means for extracting a characteristic amount of a matching information signal (vector) output from the matching means, and conversion parameter determination means for determining a parameter for a motion estimation processing upon an input video or a parameter for a detection processing of the corresponding point between the left eye and right eye images based on the characteristic amount, wherein the matching means performs the matching processing by using the parameter determined in the conversion parameter determination means.

The invention is secondly characterized in providing with characteristic amount extraction means for extracting a characteristic amount from the contents of the video instead of the characteristic amount of the matching information signal output from the matching means.

According to these features, an optimum conversion (matching) parameter for the corresponding video can be determined adaptively. Further, by performing a matching processing with the optimum conversion parameter, the matching processing becomes more correct.

The invention is thirdly characterized in that the matching means performs the image matching processing by an iterative gradient method in which a differential vector calculated based on a horizontal and vertical gradients of a pixel value and the difference between motion-compensated fields (frames) by the initial displacement motion vector is multiplied by the conversion parameter determined in the conversion parameter determination means and the result of multiplication is added to the initial displacement motion vector, so that a vector is obtained.

The invention is fourthly characterized in that the matching means performs the image matching processing by an iterative gradient method in which a number is added to or subtracted from a differential vector calculated based on a horizontal and vertical gradients of a pixel value and the difference between motion-compensated fields (frames) by the initial displacement motion vector and the resultant added or subtracted value is added to the initial displacement motion vector, so that a vector is obtained.

According to these features, a convergent speed of vectors in the iterative gradient method becomes controllable.

The invention is fifthly characterized in that an image matching method for performing an image matching by using an iterative gradient method which iteratively estimates at least one of motion or parallax of a video on a block-by-block basis based on an initial displacement vector comprises the step of forming a plurality of small blocks by dividing the block into small blocks and applying the iterative gradient method to each of the small blocks to calculate the motion or parallax for every small block.

The invention sixthly characterized in that an image matching device which performs an image matching by using an iterative gradient method for iteratively estimating at least one of motion and parallax of a video on a block-by-block basis based on an initial displacement vector comprises an initial displacement vector determination section for determining the initial displacement vector for a small block obtained by dividing the block into a plurality of blocks, and a second iterative gradient method performing means for calculating the motion vector of the small block based on the initial displacement vector determined in the initial displacement vector determination section.

According to these features, even if different motions exist within a block, more correct motion vector can be calculated and thus motions or parallaxes can be calculated more correctly.

BRIEF DESCRIPTION OF THE DRAWINGS

FIG. 4 is a block diagram illustrating the structure of main sections of a third embodiment relating to the present invention;

FIG. 5 is a graph of PSNR of a processed video according to conventional systems;

DETAILED DESCRIPTION OF THE PREFERRED EMBODIMENT

Figure 1:
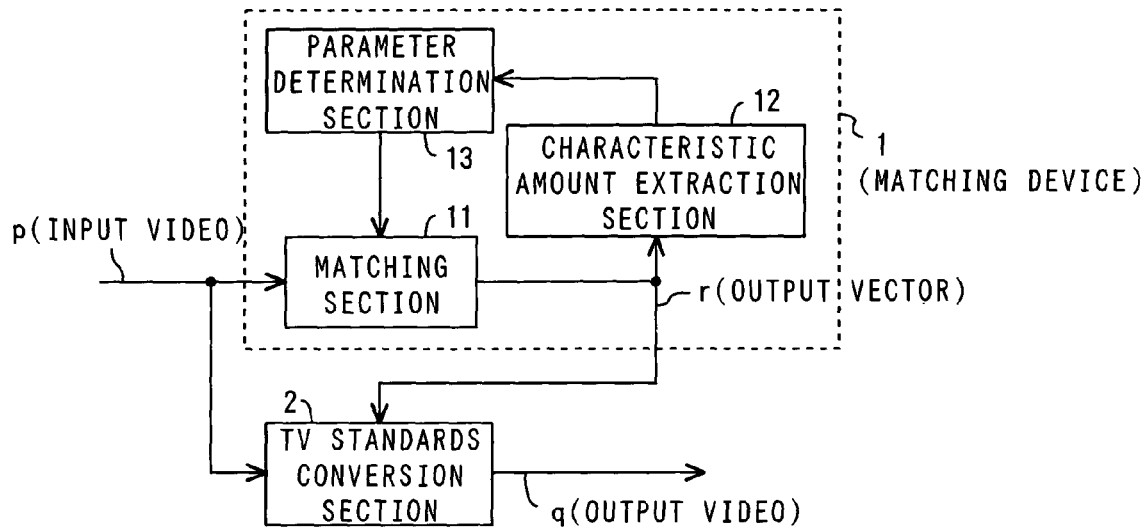
FIG. 1 is a block diagram illustrating the structure of a first embodiment of the present invention.

The present invention will be described in detail hereinafter with reference to the drawings. Firstly, the principal of the present invention will be described.

Summaries of video motion estimation and video stereo matching will be described as follows. The video motion estimation is a processing for estimating motions in portions of a motion picture (video) in a motion-compensative prediction encoding and a motion-compensated TV standards conversion. A video is usually divided into a large number of blocks and motion is obtained by calculating for each of the blocks. A block size is, for example 16 pixels×16 lines or 8 pixels×8 lines.

According to the video stereo matching, two cameras are used to obtain a set of left eye and right eye images. Then, what portions in the left eye image correspond to what portions in the right eye image is calculated by matching. The final goal of the stereo matching processing is to estimate a depth indicating how far portions in a video are set apart from the cameras. The set of images may be a set of stationary images (or still pictures) or may be a set of videos. "Image Processing Handbook" (edited by Morio Onoe, Shokodo, p. 395) describes the stereo matching.

In the image motion estimation, matching between a current frame and a previous frame is performed. Thus, the motion estimation is similar to the stereo matching as a matching processing. The description will be continued below by taking the image motion estimation processing as an example.

An iterative gradient method is a representative method for performing the image motion estimation method. The iterative gradient method is described in detail in "Improvement in motion-compensated TV standards conversion" (Kawada et., al, The journal of the institute of image information and television engineers, Vol. 51, No. 9 (1997)). A motion vector (v) calculated by the iterative gradient method is expressed by expressions (1), (2) and (3) as disclosed in the publication.

As described above, if denominators are small in expressions (2) and (3), large errors may be generated even by small disturbance factors such as noises. Thus, according to the present invention, when the denominators are small in expressions (2) and (3), a conversion parameter α smaller than 1 is multiplied by the first term in the right-side in expression (1), i.e., Δv. As a result, the following expression (4) can be obtained.

$$V = \alpha \cdot \Delta V + V_0 \quad (4)$$

(wherein $\alpha_x < 1$, $\alpha_y < 1$)

By setting the conversion parameter $\alpha$ as in expression (4), the process of a processing can be controlled. Conversion parameters are conventionally fixed. According to the present invention, an appropriate parameter is dynamically calculated depending on a design of a video or analysis of vectors serving as the result of matching in order to realize a correct scene adaptive matching processing. This is a first principal of the invention.

Next, according to the iterative gradient method, as expressed by expression (4), when a scene is provided, a correct motion vector is not determined immediately but converged iteratively. For this reason, when correlation between frames is small as in the case of scenes shot with a high-speed shutter, motion is hardly determined in the case of $\alpha < 1$. Accordingly, according to a second principal of the present invention, even if the correlation between frames is small, for example, an appropriate parameter can be calculated immediately and a correct matching processing can be performed.

According to the above description, a conversion parameter a smaller than 1 is multiplied by the differential vector $\alpha v$ in expression (1). Alternatively, a constant may be subtracted from or added to the differential vector $\alpha v$.

Next, embodiments of the present invention will be described with reference to the drawings. FIG. 1 is a block diagram illustrating the structure of a first embodiment of the present invention.

As shown in the figure, a matching device 1 is configured by a matching section 11 such as an iterative gradient method or the like, a characteristic amount extraction section 12 for extracting a characteristic amount (variance etc.) of a vector r output from the matching section 11 and a parameter determination section 13 for determining a parameter a based on the extracted characteristic amount. The output vector (r) which is a matching information signal obtained from the matching device 1 is sent to a TV standards conversion section 2. The TV standards conversion section 2 converts, for example, an input video (p) with an NTSC system into a video with a PAL system by using the output vector (r) to output the output video (q) with the PAL system. The TV standards conversion section 2 is merely an example. Instead of the TV standards conversion section, a motion-compensated encoding section may be provided and the output vector (r) may be used for motion-compensated encoding. Further, if the input video (p) is a set of left eye and right eye images, the output vector (r) may be used for a stereo matching processing.

Figure 2:
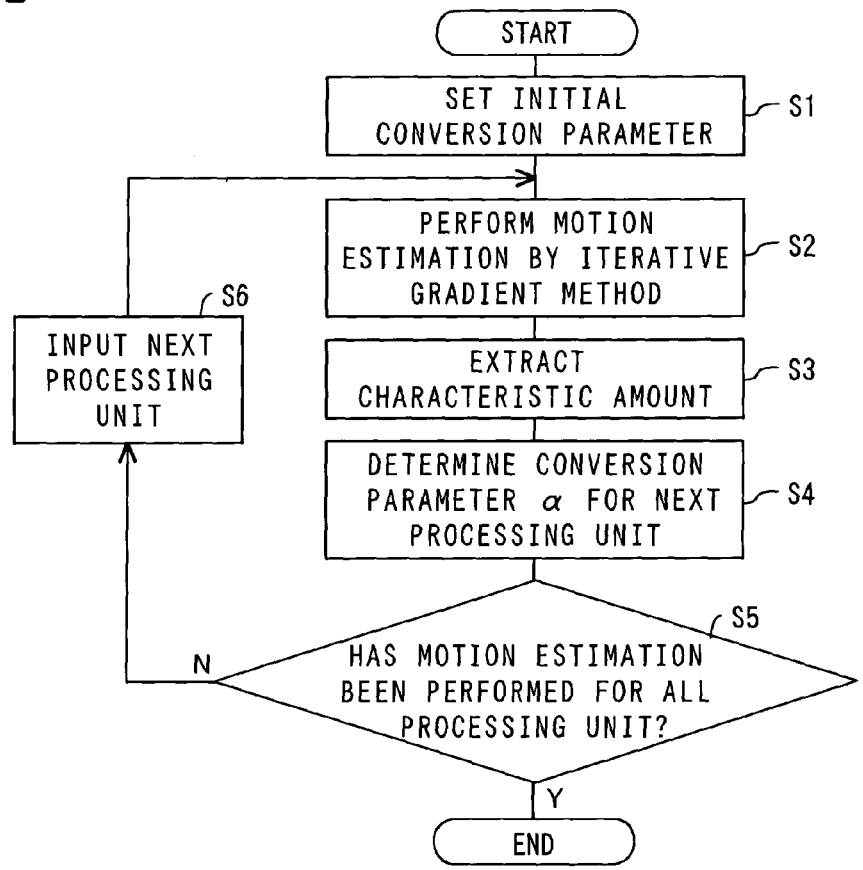
FIG. 2 is a flowchart for explaining the operation of the first embodiment.

The operation of this embodiment will be described with reference to a flowchart shown in FIG. 2. In step S1, a parameter for making the convergence of a motion vector slow, e.g., $\alpha = (\alpha_x, \alpha_y) = (0.1, 0.2)$ is set in the matching section 11 as an initial conversion parameter. Then, when the input video (p) is inputted into the matching device 1 on a predetermined processing unit basis, for example, on a block-by-block basis or a field-by-field basis, in step S2, the matching section 11 estimates motion in the corresponding processing unit by the iterative gradient method. Namely, the motion is estimated by using $\alpha$ in expression (4).

In step S3, the characteristic amount extraction section 12 extracts, i.e., calculates a characteristic amount, e.g., a variance or a standard deviation of magnitude of vectors from the distribution of motion vectors obtained by the motion estimation. In step S4, the parameter determination section 13 determines the conversion parameter $\alpha$ to be applied to the next processing unit (block) from the characteristic amount. In the case in which the characteristic amount is the variance or standard deviation, if the characteristic amount is equal to or larger than a predetermined threshold, a larger conversion parameter $\alpha$ (e.g., $\alpha = 1$) is determined. On the other hand, if the characteristic amount is smaller than the threshold, the initial conversion parameter value is maintained or determined.

In step S5, it is determined whether or not the motion estimation processing has been performed for all processing units. If the answer to the determination in step S5 is negative, the process proceeds to step S6. In step S6, the next processing unit (block) of the input video (p) is inputted. Then, the process returns to step S2 and the motion estimation is performed for the processing unit by the iterative gradient method.

The above-described processing is repeated until the answer to the determination in step S5 is affirmed. If the answer is affirmed, the motion estimation processing by scene adaptive dynamic parameter control is completed.

According to this embodiment, the conversion parameter $\alpha$ can be changed depending on characteristic amounts of motion vectors. Thus, when great variation between frames is not found in the input video (p), for example, when a regularly repeated pattern exists in a picture, the conversion parameter $\alpha$ is determined to be small. On the other hand, when correlation between frames is small and motion objects are set apart between adjacent frames, the conversion parameter $\alpha$ is determined to be large. As a result, even when pictures whose appropriate matching processings are difficult to exist at the same time are provided, these processings can exist at the same time.

Figure 3:
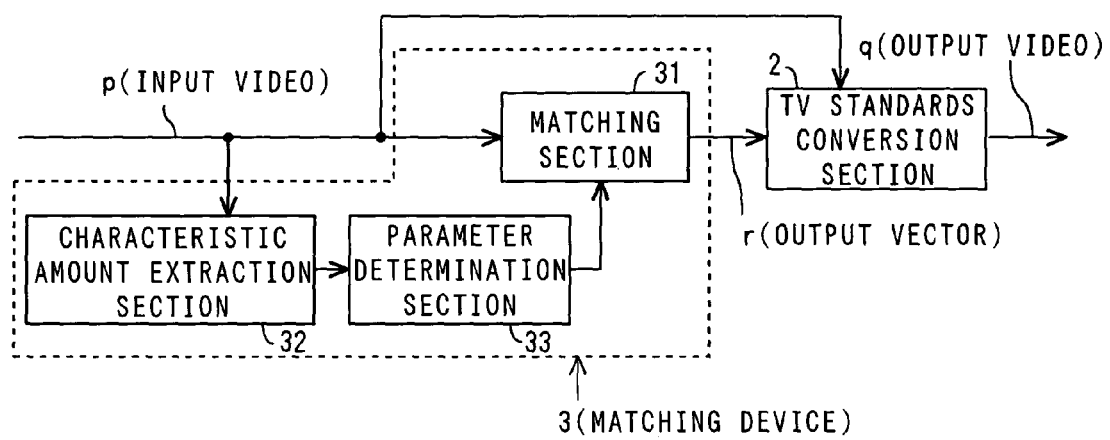
FIG. 3 is a block diagram illustrating the structure of a second embodiment of the present invention.

Next, a second embodiment of the present invention will be described with reference to the block diagram in FIG. 3. According to this embodiment, a matching device 3 is configured by a matching section 31, a characteristic amount extraction section 32 for extracting a characteristic amount of an input video (p) and a parameter determination section 33 for determining a conversion parameter $\alpha$ from the extracted characteristic amount.

According to this embodiment, the characteristic amount extraction section 32 extracts the characteristic amount, e.g., variation of brightness of pixel values, its variance or standard deviation from the input video (p). When the characteristic amount is equal to or larger than a predetermined threshold, the parameter determination section 33 determines a conversion parameter to be large. On the other hand, when the characteristic amount is smaller than the threshold, the initial conversion parameter is maintained or determined as in the first embodiment. Because the second embodiment is the same as the first embodiment except this operation, the description of the second embodiment will be omitted.

As described above, according to this embodiment, even when pictures whose appropriate matching processings are difficult to exist at the same time are provided, these matching processings can exist at the same time.

Next, a third embodiment of the present invention will be described with reference to FIG. 4. According to this embodiment, whether denominators in expressions (2) and (3) are small when a differential vector is calculated in the iterative gradient method is determined. Then, parameters are controlled adaptively depending on such determination. FIG. 4 is a block diagram illustrating one specific structure of the matching section 11, 31.

The matching section according to this embodiment is configured by first and second calculation sections 41, 42 for calculating numerators of expressions (2) and (3) from an input video (P), a third calculation section 43 for calculating denominators of these expressions, a fourth calculation section 44 for performing a division in expression (2), a fifth calculation section 45 for performing a division in expression (3), $\alpha_x$ and $\alpha_y$ determination sections 46 and 47 for determining a conversion parameter $\alpha$ ($\alpha_x$, $\alpha_y$) based on the denominators calculated in the third calculation section 43 and the conversion parameter $\alpha$ from the parameter setting section 13, multiplication sections 48, 49 and addition sections 50, 51.

According to this embodiment, the third calculation section 43 calculates the denominators in expressions (2) and (3). If the denominators are equal to or smaller than a predetermined threshold, the $\alpha_x$ determination section 46 and the $\alpha_y$ determination section 47 forcibly determine smaller ($\alpha_x$, $\alpha_y$) respectively. Thus, it is possible to prevent large errors from being generated in motion estimation by small disturbance factors such as noises. On the other hand, if the denominators are larger than the threshold, the $\alpha_x$ determination section 46 and the $\alpha_y$ determination section 47 determine the conversion parameter $\alpha$ determined in the parameter setting section 13, 33 as ($\alpha_x$, $\alpha_y$).

$\Delta v_x$ output from the fourth calculation section 44 is multiplied by $\alpha_x$ determined in the $\alpha_x$ determination section 46 in the multiplication section 48. $\Delta v_y$ output from the fifth calculation section 45 is multiplied by $\alpha_y$ determined in the $\alpha_y$ determination section 47 in the multiplication section 49. The result of multiplication in the multiplication section 48 is added to $v_{0x}$ in the addition section 50. The result of multiplication in the multiplication section 49 is added to $v_{0y}$ in the addition section 51. As a result, an output vector (r), i.e., ($v_x$, $v_y$) can be obtained.

As described above, according to this embodiment, in the case of an input video that a regularly repeated pattern exists in the picture, small conversion parameters are forcibly determined and thus disturbance factors do not contribute much to the motion estimation. Thus, generation of errors in the motion estimation caused by small disturbance factors such as noises can be reduced.

According to the embodiments, $v = \alpha \cdot \Delta v + v_0$ (wherein $\alpha_x < 1$, $\alpha_y < 1$) is provided as expression (4). However, $v = (\Delta v - P) + v_0$ (wherein P is a positive number) or $v = (\Delta v + Q) + v_0$ (wherein Q is a positive number) may be used. P and Q may be changed adaptively as the conversion parameter $\alpha$ in order to change the degree of contribution of $\Delta v$ to the motion estimation.

The present inventor incorporates the system of the present invention into a TV standards conversion algorithm and evaluates its performance by a computer simulation.

According to the TV standards conversion, an SN ratio cannot be calculated in an original and converted videos. Then, a test video of 625 lines and 50 fields/second is firstly converted into a video of 525 lines and 60 fields/second. The resultant video is inversely converted into a processed video of 625 lines and 50 fields/second. A PSNR is calculated for the processed video and the original video. Algorithms for conversion and inverse conversion are the same except for parameters such as a ratio of line number and a field interpolation ratio.

Two types of videos with different optimum conversion parameters are prepared as test videos. Namely, 25 frames of an "Interview" with a lattice pattern with its wall and 25 frames of a "Carousel" shot with a high speed shutter are connected serially. The former 50 fields are determined as "Interview" scene and the latter 50 fields are determined as "Carousel" scene (50 frames in total). The standard deviation of magnitude of a motion vector generated in the former fields is used as a characteristic amount extracted in the characteristic amount extraction section 12 (see FIG. 1) (one characteristic amount per field). The parameter determination section 13 sets an appropriate threshold. If the characteristic amount is larger than the threshold, a conversion parameter in the next field is determined as a motion priority type ($\alpha = (1, 1)$ in expression (4)) and if the characteristic amount is smaller than the threshold, the conversion parameter is determined as a stationary priority type ($\alpha = (0.1, 0.2)$ in expression (4)). Namely, the conversion parameter is adaptively varied. Conversion parameters which are suitable for the scenes in the "Interview" and "Carousel" are the stationary priority type ($\alpha = (0.1, 0.2)$ in expression (4)) and the motion priority type ($\alpha = (1, 1)$ in expression (4)), respectively.

Figure 6:
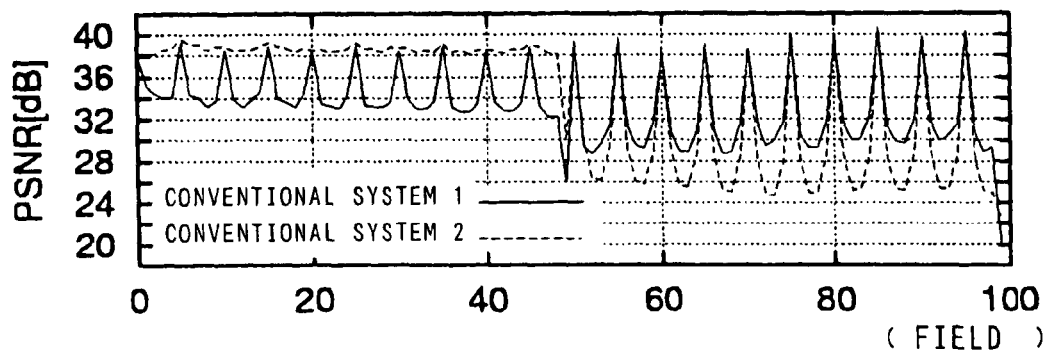
FIG. 6 is a graph of PSNR of a processed video according to the system of the present invention.
Figure 7:
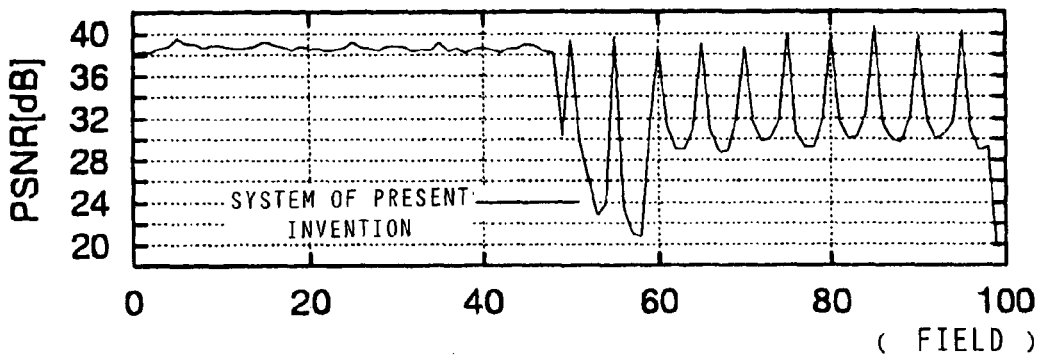
FIG. 7 is a table of PSNRs [dB] and averaged PSNRs in the respective scenes according to the conventional systems 1 and 2, and the system of the present invention.

FIG. 5 shows a graph of PSNR of a processed video when a TV standards conversion is performed according to conventional systems 1 and 2. FIG. 6 shows a graph of PSNR of a processed video when the TV standards conversion is performed according to the system of the present invention. FIG. 7 shows average PSNRs in the respective scene intervals in the systems. In the conventional system 1 shown in FIG. 5, the motion priority type is used as a conversion parameter in a fixed manner. In the conventional system 2, the stationary priority type is used as a conversion parameter in a fixed manner. According to the system of the present invention, the motion priority type and the stationary priority type are used adaptively.

As the result of the experiment, a large degradation occurs in the "Interview" scene in the conventional system 1 but the "Carousel" scene is converted excellently, as seen from FIGS. 5 and 7. In the conventional system 2, although the "Interview" scene is converted excellently, a large degradation occurs in the "Carousel" scene. This is because appropriate conversion parameters are not used in the degraded scenes.

According to the system of the present invention, as seen from FIGS. 6 and 7, it is confirmed that appropriate conversion parameters a for the "Carousel" and "Interview" scenes are automatically selected and conversion is performed excellently. Referring to FIG. 7, it is found that better PSNR (average) can be obtained as compared to the cases of the conventional systems 1 and 2. According to the system of the present invention, immediately after a scene change, an SN is remained low for a while. This is considered that a degree of mismatch becomes large in a portion that different conversion parameters are selected for conversion and inverse conversion.

As apparent from above, according to the present invention, the contents of an output matching information signal (vector) and an input video signal are automatically analyzed in order to extract characteristic amounts thereof. As a result, an optimum conversion (matching) parameter for the corresponding video can be determined adaptively. Further, by performing a matching processing with the optimum conversion parameter, the matching processing becomes more correct.

Further, according to the present invention, it is determined whether or not a denominator when a differential vector is calculated is smaller than a predetermined threshold. If the denominator is smaller than the threshold, the conversion parameter is set to be smaller than 1 or a number to be subtracted is set to be larger or a number to be added is set to be smaller. Thus, it is possible to prevent incorrect estimated vectors due to noises from being generated.

Figure 8:
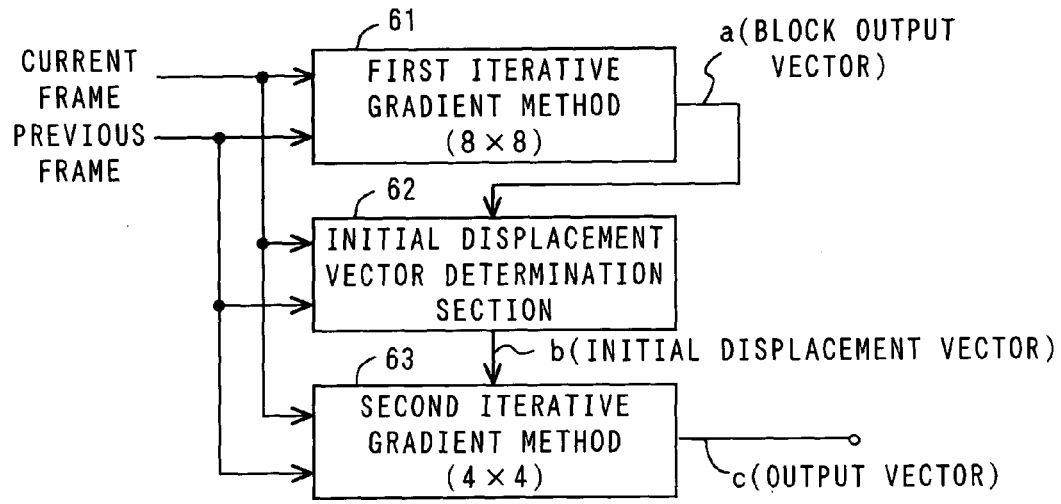
FIG. 8 is a block diagram illustrating the structure of a fourth embodiment of the present invention.
Figure 9:
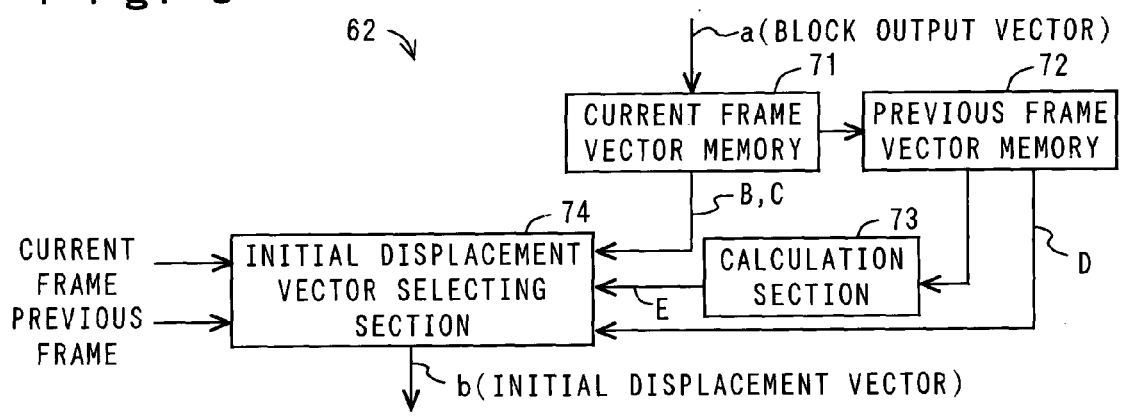
FIG. 9 is a block diagram illustrating one specific example of an initial displacement vector determination section shown in FIG. 8.

A fourth embodiment of the present invention will be described with reference to FIGS. 8 through 10. FIG. 8 is a block diagram illustrating an embodiment of an image matching method for motion pictures relating to the present invention.

A first iterative gradient method 61 performs a first stage iterative gradient method (block size 8×8; large block) by using input current and previous frame videos in order to calculate a motion vector for each of the blocks. The motion vector is input as a block output vector (a) to an initial displacement vector determination section 62. The initial displacement vector determination section 62 determines an initial displacement vector (b) for a second iterative gradient method 63 (block size 4×4; small block) from among motion vector candidates that include the block output vector (a) and/or a motion vector calculated based on the block output vector (a) obtained by using the input current and previous frame videos. The second iterative gradient method 63 performs a second stage iterative gradient method based on the initial displacement vector (b) in order to calculate a motion vector (output vectors (c)) for each of the small blocks.

By the above-described matching method, a motion vector can be calculated more correctly even if different motions exist within a block.

Next, the structure and the operation of one specific example of the initial displacement vector determination section 62 will be described with reference to FIG. 9. The initial displacement vector determination section 62 is configured by a current frame vector memory 71 which stores the block output vector (a) of the current frame, a previous frame vector memory 72 which stores the block output vector (a) of the previous frame, a calculation section 73 which performs, for example, an averaging calculation and an initial displacement vector selecting section 74. The initial displacement vector selecting section 74 selects an optimum motion vector from among motion vector candidates sent from the current frame vector memory 71, the previous frame vector memory 72 and the calculation section 73 by performing the matching processing with the current and previous frame videos and outputs the selected vector as the initial displacement vector (b).

Figure 10A:
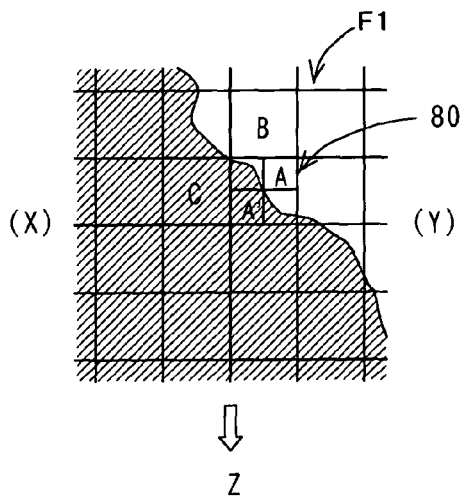
FIGS. 10A and 10B are explanatory views of motion vector candidates for explaining the operation of the fourth embodiment.
Figure 10B:
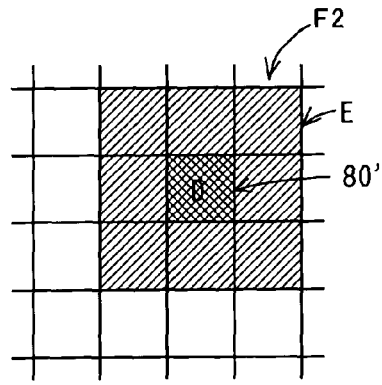

The operation of the initial displacement vector determination section 62 shown in FIG. 9 will be described with reference to FIGS. 10A and 10B. FIG. 10A illustrates a conceptual view F1 of the corresponding block 80 whose motion vector is calculated by an iterative gradient method and motion vectors B and C of neighbor blocks of the corresponding block 80 stored in the current frame vector memory 71. FIG. 10B illustrates a conceptual view F2 of a motion vector D for a block 80' corresponding to the corresponding block 80 in the previous frame stored in the previous frame vector memory 72 and a neighbor vector E thereof. The reference character E indicates an averaged motion vector of nine motion vectors including the motion vector D. E needs not to indicate the averaged vector and may indicate a motion vector calculated by other calculation expression.

As shown in FIG. 10A, it is assumed that different motions or parallaxes exist within the corresponding block 80, for example, the motion vector C side of the corresponding block 80 belongs to an object (X) moving in a Z direction and the motion vector B side thereof belongs to a background (Y). The corresponding block 80 is divided into small blocks and motion vectors for the small blocks are calculated. The motion vectors B and C for the neighbor blocks of the corresponding block 80 are sent from the current frame vector memory 71 to the initial displacement vector selecting section 74 as motion vector candidates. The motion vector D for the block 80' in the previous frame corresponding to the corresponding block 80 and the motion vector E averaged in the calculation section 73 are sent as motion vector candidates from the previous frame vector memory 72 to the initial displacement vector selecting section 74.

When the initial displacement vector A for a small block obtained by dividing the corresponding block 80 into four blocks is calculated, the initial displacement vector selecting section 74 calculates the differential sum of squares on corresponding points with the previous frame by using the motion vector candidates B through E and a pixel value within the small block so as to determine a motion vector with the smallest differential sum of squares as the initial displacement vector (b). Thus, more correct motion vector may be selected as the initial displacement vector A for the corresponding small block with high possibility. Similarly, more correct motion vector may be selected as an initial displacement vector A' for the small block which belongs to the object (X) side with high possibility.

Only the motion vectors for the neighbor blocks of the corresponding block accumulated in the current frame vector memory 71 may be used as the motion vector candidates. A block is divided into small blocks and an initial displacement vector is calculated for each of the small blocks. Apparently, this is performed not only for blocks where different motions or parallaxes exist but for all blocks.

Figure 11:
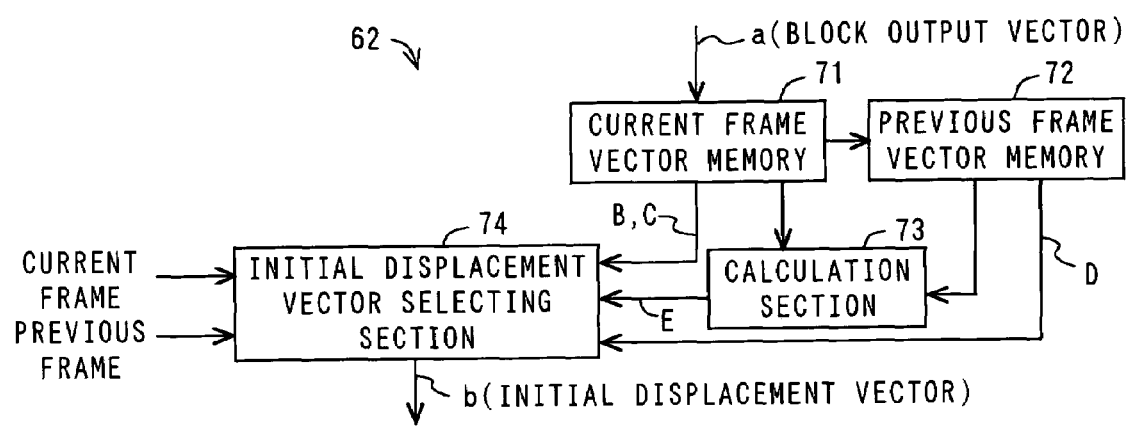
FIG. 11 is a block diagram illustrating another specific example of the initial displacement vector determination section.

FIG. 11 shows a modified example of the initial displacement vector determination section 62. FIG. 11 is different from FIG. 9 in that neighbor motion vectors accumulated in the current frame vector memory 71 are input to the calculation section 73 and an averaged motion vector of the current and previous frame vectors obtained by the calculation section 73 is added to the motion vector candidates in the initial displacement vector selecting section 74.

According to the above-described embodiments, the neighbor motion vector B for the block on the corresponding block 80, the neighbor motion vector C for the block at the left side of the corresponding block 80, the motion vector D for the block 80' of the previous frame corresponding to the corresponding block 80 and the averaged motion vector E are the motion vector candidates. The present invention is not limited to this case. Other neighbor motion vectors may be added to the motion vector candidates.

When the initial displacement vector is determined for a small block as described above, the second stage iterative gradient method 63 is performed by using the initial displacement vector, so that more correct motion vector for each small block is output as an output vector.

As described above, according to the fourth embodiment, even if different motions exist within a block, more correct motion vector can be calculated and thus motions or parallaxes can be calculated more correctly.

Further, an initial displacement vector for a small block can be easily and correctly determined and a motion vector for a small vector can be calculated more correctly by using an iterative gradient method.

What is claimed is:

1. An image matching device for at least one of automatically estimating motion in a motion picture and automatically detecting a corresponding point between stereo videos formed of a left eye and right eye images, comprising:

matching means for performing a matching processing upon a video;

characteristic amount extraction means for extracting a characteristic amount of a matching information signal (vector) output from the matching means; and conversion parameter determination means for determining a parameter for a motion estimation processing upon an input video or a parameter for a detection processing of the corresponding point between the left eye and right eye images based on the characteristic amount, wherein the matching means performs the matching processing by using the parameter determined in the conversion parameter determination means, and wherein the matching means performs the image matching processing by an iterative gradient method in which a differential vector calculated based on a horizontal and vertical gradients of a pixel value and the difference between motion-compensated fields (frames) by the initial displacement motion vector is multiplied by the conversion parameter determined in the conversion parameter determination means and the result of multiplication is added to the initial displacement motion vector, so that a vector is obtained.

2. The image matching device according to claim 1, wherein the matching means comprises means for determining whether or not a denominator when calculating the differential vector calculated based on a horizontal and vertical gradients of a pixel value and the difference between motion-compensated fields (frames) by the initial displacement motion vector is smaller than a predetermined threshold, and the conversion parameter is determined so that a degree of contribution of the differential vector is small if the denominator is smaller than the threshold.

3. The image matching device according to claim 1, wherein the characteristic amount of the matching information signal (vector) is a variance of a vector.

4. An image matching device for at least one of automatically estimating motion in a motion picture and automatically detecting a corresponding point between stereo videos formed of a left eye and right eye images, comprising:

matching means for performing a matching processing upon a video;

characteristic amount extraction means for extracting a characteristic amount of a matching information signal (vector) output from the matching means; and conversion parameter determination means for determining a parameter for a motion estimation processing upon an input video or a parameter for a detection processing of the corresponding point between the left eye and right eye images based on the characteristic amount, wherein the matching means performs the matching processing by using the parameter determined in the conversion parameter determination means, and wherein the matching means performs the image matching processing by an iterative gradient method in which a number is added to or subtracted from a differential vector calculated based on a horizontal and vertical gradients of a pixel value and the difference between motion-compensated fields (frames) by the initial displacement motion vector and the resultant added or subtracted value is added to the initial displacement motion vector, so that a vector is obtained.

5. The image matching device according to claim 4, wherein the matching means comprises means for determining whether or not a denominator when calculating the differential vector calculated based on a horizontal and vertical gradients of a pixel value and the difference between motion-compensated fields (frames) by the initial displacement motion vector is smaller than a predetermined threshold, and the added or subtracted number is determined so that a degree of contribution of the differential vector is small if the denominator is smaller than the threshold.

* * * * *